United States Patent [19]
Byrne et al.

[11] 3,929,277
[45] Dec. 30, 1975

[54] ANIMAL FOOD MONITOR

[75] Inventors: John A. Byrne; Charles K. Rhea, Jr., both of Cookeville, Tenn.

[73] Assignee: Universal Identification Systems, Inc., Cookeville, Tenn.

[22] Filed: Dec. 12, 1974

[21] Appl. No.: 532,204

[52] U.S. Cl. 235/61.6 R; 235/61.11 E; 235/61.11 H; 119/51 R; 235/92 WT
[51] Int. Cl.² ...................... G06K 7/08; A01K 5/02
[58] Field of Search ... 235/61.6 R, 92 WT, 61.11 E, 235/61.11 H; 119/51 R

[56] References Cited
UNITED STATES PATENTS

| | | | |
|---|---|---|---|
| 3,516,575 | 6/1970 | Moffitt | 222/52 |
| 3,553,441 | 1/1971 | Launder | 119/51 R |
| 3,788,276 | 1/1974 | Propst et al. | 119/51 R |

*Primary Examiner*—Stanley M. Urynowicz, Jr.
*Attorney, Agent, or Firm*—William S. Dorman

[57] ABSTRACT

A system for determining the amount of food consumed in a given period of time by each of a plurality of animals, such as cattle, comprising a feed station which the animals can enter individually and separately for feeding purposes. The feed station includes a feed hopper mounted on a scale. Means, such as a photo-electric sensing device, are provided to determine the presence of an animal at the feed hopper. Actuation of the photo-electric sensing means will energize an interrogation coil which sends an electromagnetic pulse to the animal to activate an identification tag attached to the animal. The identification tag will be a small R.F. transmitter capable of transmitting R.F. pulses equal in number to the identification number assigned to that particular animal. Each identification means will have its own source of power which is momentarily engaged during the period of time that the identification means is transmitting R.F. pulses for identifying the given animal. A magnetic reed switch will be momentarily actuated by the electromagnetic pulse from the electromagnetic interrogation coil. The overall apparatus will be provided with an R.F. receiver which will receive the pulses from the identification tag transmitter and which will address a memory cell in a memory corresponding to the number of the given animal. Thereafter, a weight-sensing device or scale will sense the amount of feed consumed by the given animal and will transfer this information into the memory cell corresponding to that animal. When the animal leaves the feed station, the information as to the amount of food consumed by that given animal will be "dumped" into the memory cell corresponding to that given animal on top of any other information that is presently in that memory cell with regard to that animal. After the animal departs, the various portions of the apparatus will be returned to zero in readiness for the entry of the next animal.

6 Claims, 9 Drawing Figures

ANIMAL FOOD MONITOR

FIELD OF THE INVENTION

This invention relates to apparatus for determining the amount of feed consumed by an animal. More particularly, the present invention is designed to measure and store information concerning the amount of food consumed by each of a plurality of animals.

THE PRIOR ART

It is well recognized that not all animals of a given class are equally efficient from the standpoint of putting on weight. For example, one animal might put on more weight for the consumption of a given amount of food than another animal of the same age and breed who consumes an identical quantity of food. If these "efficient" animals could be segregated from the rest and cross-bred, it might be possible to develop a breed of animals which could put on a maximum of weight for a minimum quantity of feed consumed. The savings in feed could lead to a reduction in the cost of meat to the consumer.

Attempts have been made in the past to segregate the more "efficient" animals from the less "efficient" animals. However, since animals, such as cattle, are gregarious in nature, efforts to observe and measure the eating habits of individual animals have been largely unsuccessful.

SUMMARY OF THE INVENTION

The present invention involves a feed station, located at a feed lot for example, where only one animal at a time can enter the feed station and feed from the feed hopper. There will be a number of animals in the feed lot who will have access to the feed station so that the animals will not be lonely or isolated from other animals.

At any event, each animal will be assigned a separate number (for example, 1 to 15). Each animal will be provided with a separate identification means, referred to herein as a tag which can be attached to the animal's ear, for example, or which might be imbedded under the animal's skin, if desired. Each tag will transmit a number of radio frequency pulses when actuated and the number of these pulses will be equal to the number assigned to that given animal. The system will include the radio frequency receiver which will receive and hold the number of the tag that has been actuated when the animal is in the feed station. The information gathered by the receiver is changed into a form that will locate a specific memory cell (corresponding to the identity of the given animal) within a memory bank. The feed, which is to be consumed by the animal, is located in a feed hopper resting upon scales. The receiver, therefore, opens the memory cell to information from the scales as to the amount of feed consumed by the given animal.

The memory involved in the present invention is a series of electronic addresses (one for each animal) that can receive and hold information. This information can be retrieved or added to at any time. Preferably, the information will be in the form of a two digit number; this number will be the sum of feed taken by any of the various animals within a given time period. As indicated above, each animal will have its own memory space and the total amount that each given animal eats will be collected in its exclusive memory space. The total for each animal, or for all animals, can be retrieved on a daily or weekly basis, and if more than two digits are desired, the memory space can be enlarged with very little problem.

The feed hopper rests upon scales which are adapted to measure, record and transmit information relative to the amount of feed consumed by the given animal after its entry into the feed station. The scales, briefly, include a hydraulic load cell with means for changing the pressure exerted on the hydraulic load cell into a binary coded signal representing the amount of pounds consumed by the animal. The scales logic also includes means for determining the direction of movement of the hopper up or down so as to prevent false indications of feed consumption. The scales are also designed to set themselves to zero before an animal commences eating at the feeding station. Thus, the weight that is removed is a number that represents the exact number of pounds of feed removed. While the animal is in the feed station, the information received from the scales is fed to a counter. When the animal leaves the feed station, the information from the counter is "dumped" into the memory and the counter and memory address are returned to zero in readiness for the next animal.

DESCRIPTION OF THE PREFERRED EMBODIMENT

Figure 1:
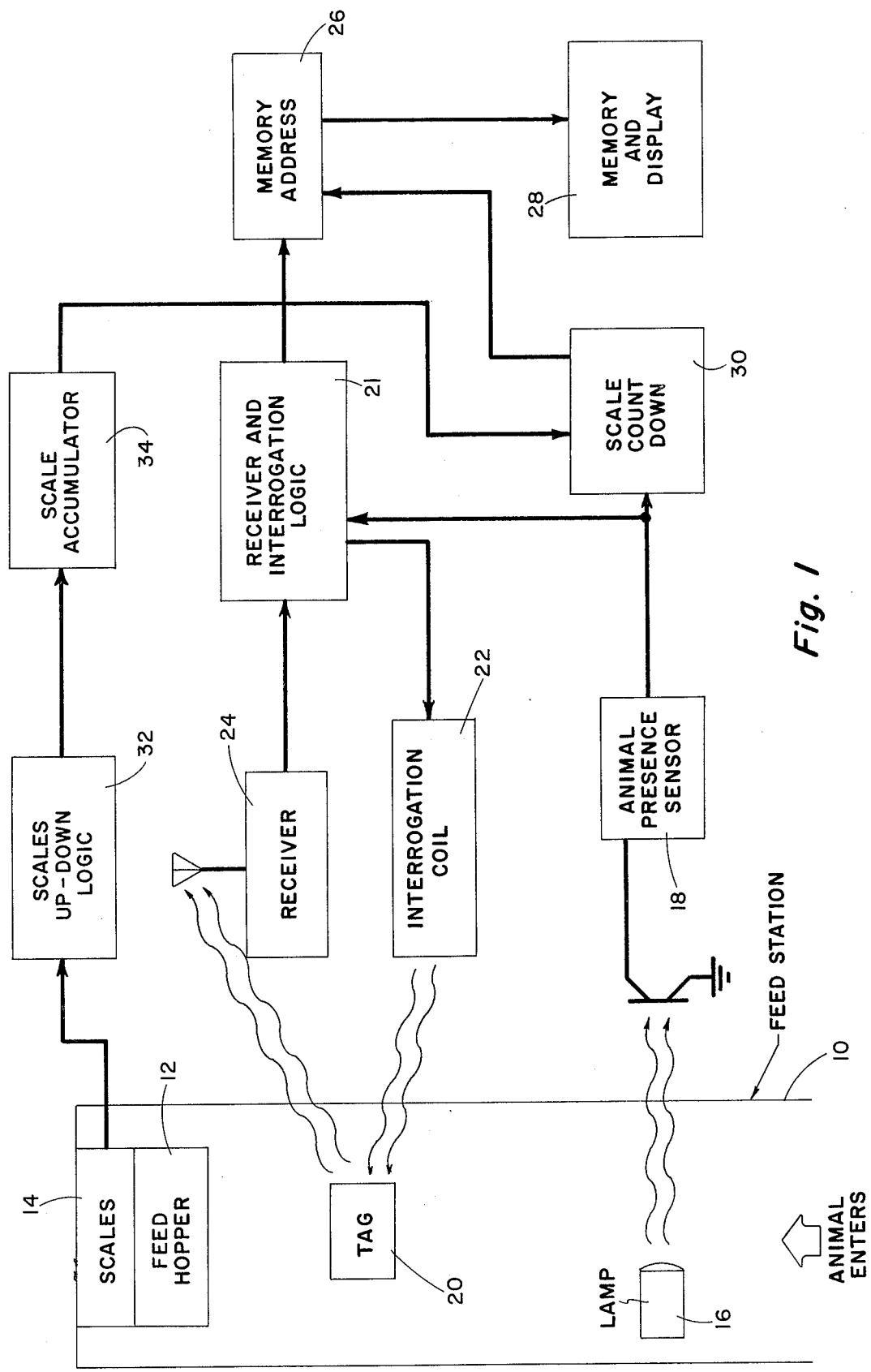
FIG. 1 is a block diagram showing the major components of the present invention.
Figure 2:
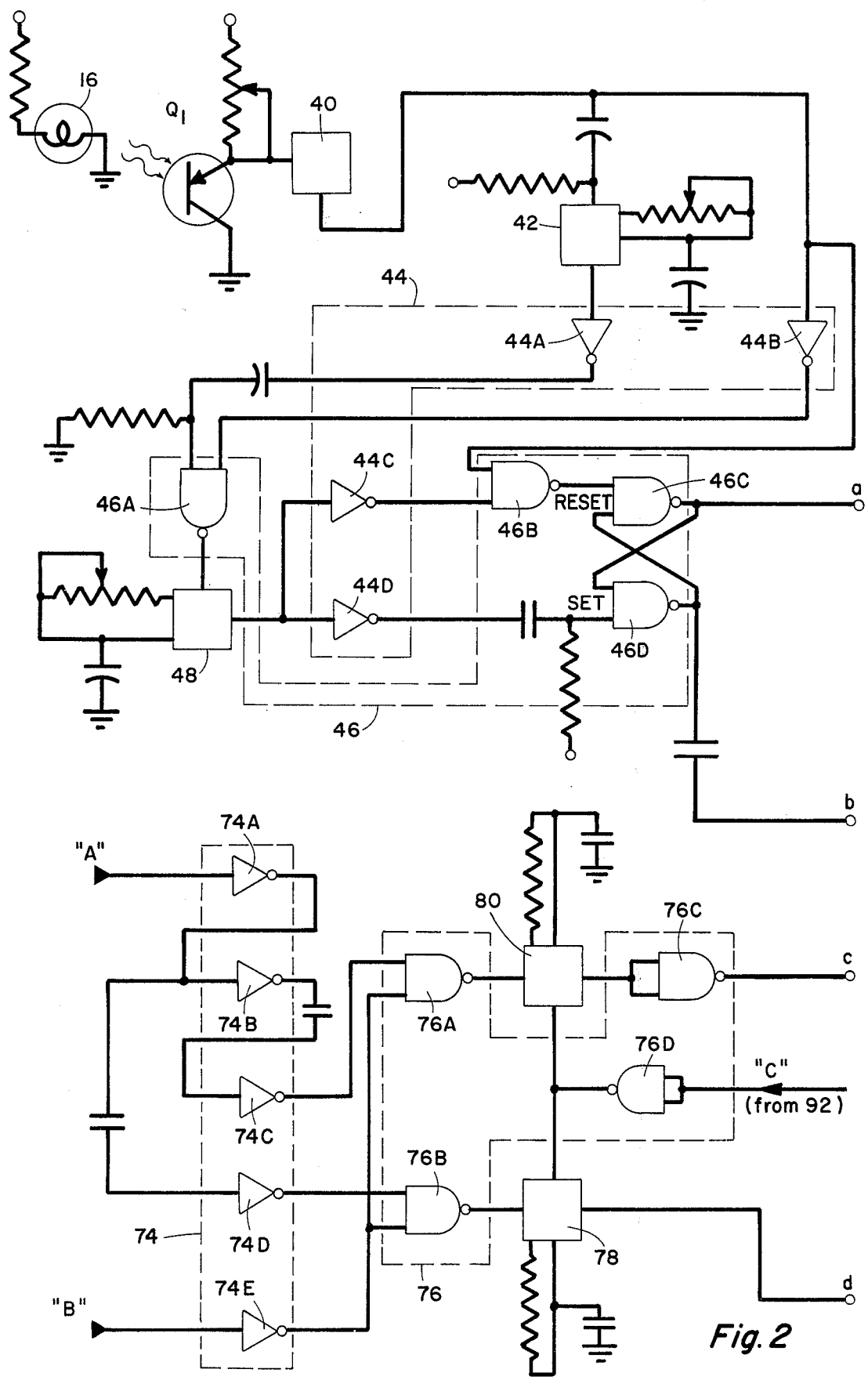
FIGS. 2, 3, 4 and 5, taken in combination, with FIG. 3 placed in the right of FIG. 2, FIG. 4 placed above FIG. 3, and FIG. 5 placed to the right of FIG. 3, constitute a more detailed block diagram of the electrical circuitry involved in the block diagram of FIG. 1.

Referring to the drawings in detail, FIG. 1 shows a feed station 10, which will permit the entry of an animal (not shown) such as a calf. The feed station 10 is provided with a feed hopper 12 opposite from the open end where the animal enters. The feed hopper will be resting on scales or a weight-sensing device 14, the details of which will be described hereinafter. Somewhere near the entrance to the feed station 10, there will be located a lamp 16 which will direct a beam of light to a sensor 18 which will include one or more photo-electric cells or the like. The animal will be provided with a tag 20 which will be described hereinafter in greater detail; however, the tag is preferably attached to the ear of the animal and would be approximately in the position shown in FIG. 1 after the animal interrupted the light beam from the lamp 16 to the sensor 18 and when it was approaching the feed hopper.

At any event, when the animal interrupts the beam of light from the lamp 16 to the sensor 18, the latter sends a signal to the logic circuit 21 which in turn sends a signal to the interrogation coil 22. The interrogation coil sends a signal to the tag 20. The tag 20 has an internal circuit which will be described hereinafter, and which, in response to the signal from the interrogation coil 22, sends a binary coded signal to a receiver 24 identifying the particular animal which has entered the feed station 10. After the receiver 24 has received the signal properly identifying the animal, a signal is sent from the receiver 24 back to the logic circuit 21 which then does two things: First of all, the logic circuit shuts off the interrogation coil 22; secondly, the logic circuit 21 sends a signal to the memory address 26 which then calls up a memory cell from the memory 28 corresponding to the number identified on the tag 20.

In the meantime, the sensor 18 would have sent a signal to the scale countdown circuit 30 resetting the latter to zero. When the animal has consumed sufficient feed from the feed hopper 12 so that the scales 14 can make a definitive positive reading, a signal is fed from the scales to the scales up-down logic 32 and from there through a scale accumulator 34 to the scale countdown 30. The scale up-down logic 32 senses the up-down movement of the feed hopper 12 in response to movement thereof by the animal's head and the withdrawal of feed from the hopper; the scale accumulator 34, briefly, prevents the passage of below zero signals (as will be explained hereinafter) to the scale countdown 30. After the animal finishes feeding, it leaves the feed station 10 and the sensor 18 is again activated by the lamp 16. Activation of the sensor 18 prevents any further signals being transmitted to the scale countdown 30 from the scale's system and, thereafter, the information from the scale countdown 30 is "dumped" into the memory 28 through the memory address 26. After the information has been "dumped" into the memory from the scale countdown, the memory address is returned to zero.

Before proceeding with a detailed description of FIGS. 2 through 5, inclusive, it should be mentioned that the circuit includes numerous conventional integrated circuits, or chips, some of the components of which are used in different portions of the overall circuit. For the sake of convenience, each individual integrated circuit, or chip, is outlined in dotted lines and provided with a numerical designation and the component parts thereof are provided with letter designations following the number.

As shown in FIGS. 2 through 5 inclusive, the lamp 16 is designed to direct a beam of light to a photo-transistor Q1. The output of Q1 is fed to an amplifier 40 (standard integrated circuit designation NE 555). The relationship between Q1 and amplifier 40 is such that, when the beam of light from the lamp 16 is broken, the output of amplifier 40 goes low which starts a timer 42 (NE 555) having a timing cycle of approximately ½ second. When the timer 42 times out, its output goes low and this low output, together with the existing low output from the amplifier 40 are fed to inverters 44A and 44B, respectively, of integrated circuit 44 (7404). The outputs of inverters 44A and 44B are fed to NAND gate 46A of integrated circuit 46 (7400); at this point the output of gate 46A will go low to start a timer 48 (NE 555) having a time delay of approximately ½ second.

When the timer 48 starts, its output goes high and is inverted in inverters 44C and 44D. The output of inverter 44D is fed to NAND gate 46D which together with NAND gate 46C constitute a set-reset flip-flop which is "set" by the low signal from inverter 44D. At this time the output of 46D goes high and the output of 46C goes low. The output of NAND gate 46B is used to "reset" the flip-flop in a manner later to be described.

When the output of NAND gate 46D goes high, it sets the scales up-down counters 50 and 52 to zero as will now be described. Counter 50 (74192) will count the unit pounds from the scales logic in a manner later to be described whereas counter 52 (74192) counts the tens pounds, also in a manner later to be described. The outputs of counters 50 and 52 are binary coded decimals corresponding to pounds. In the event that the counters 50 and 52 are other than at zero, the high output pulse from NAND gate 46D will set these counters to zero.

Figure 3:
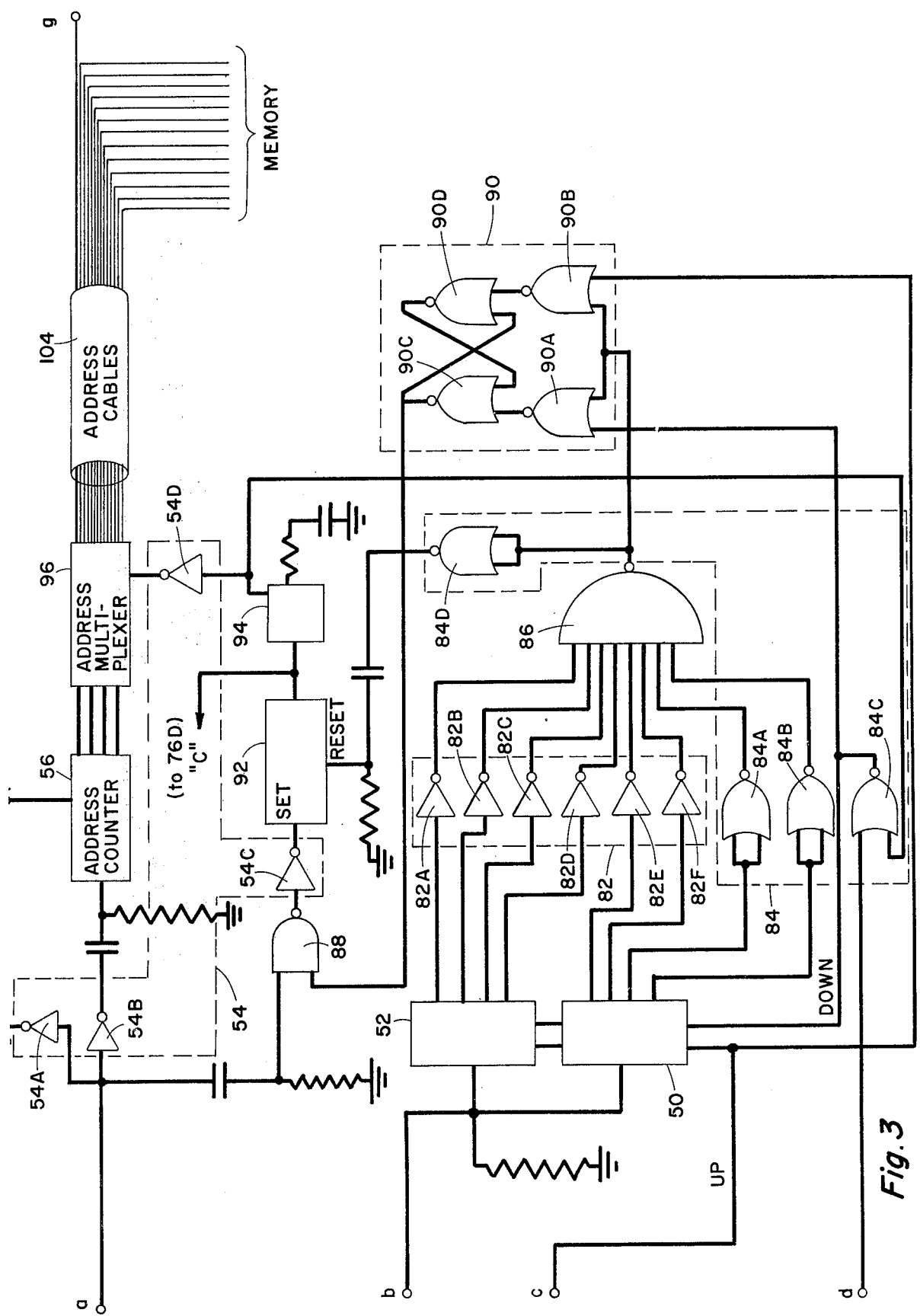
Figure 4:
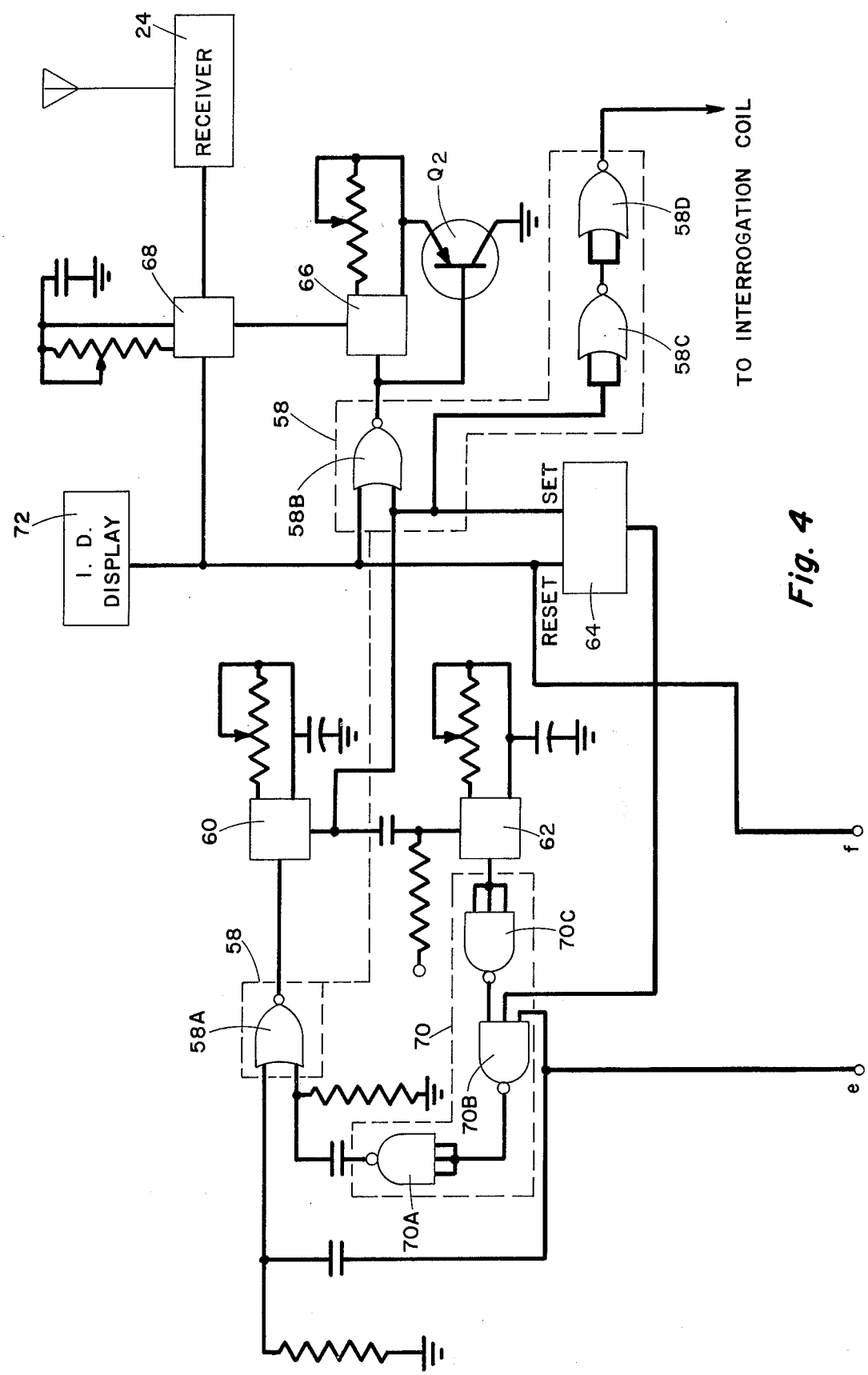
Figure 5:
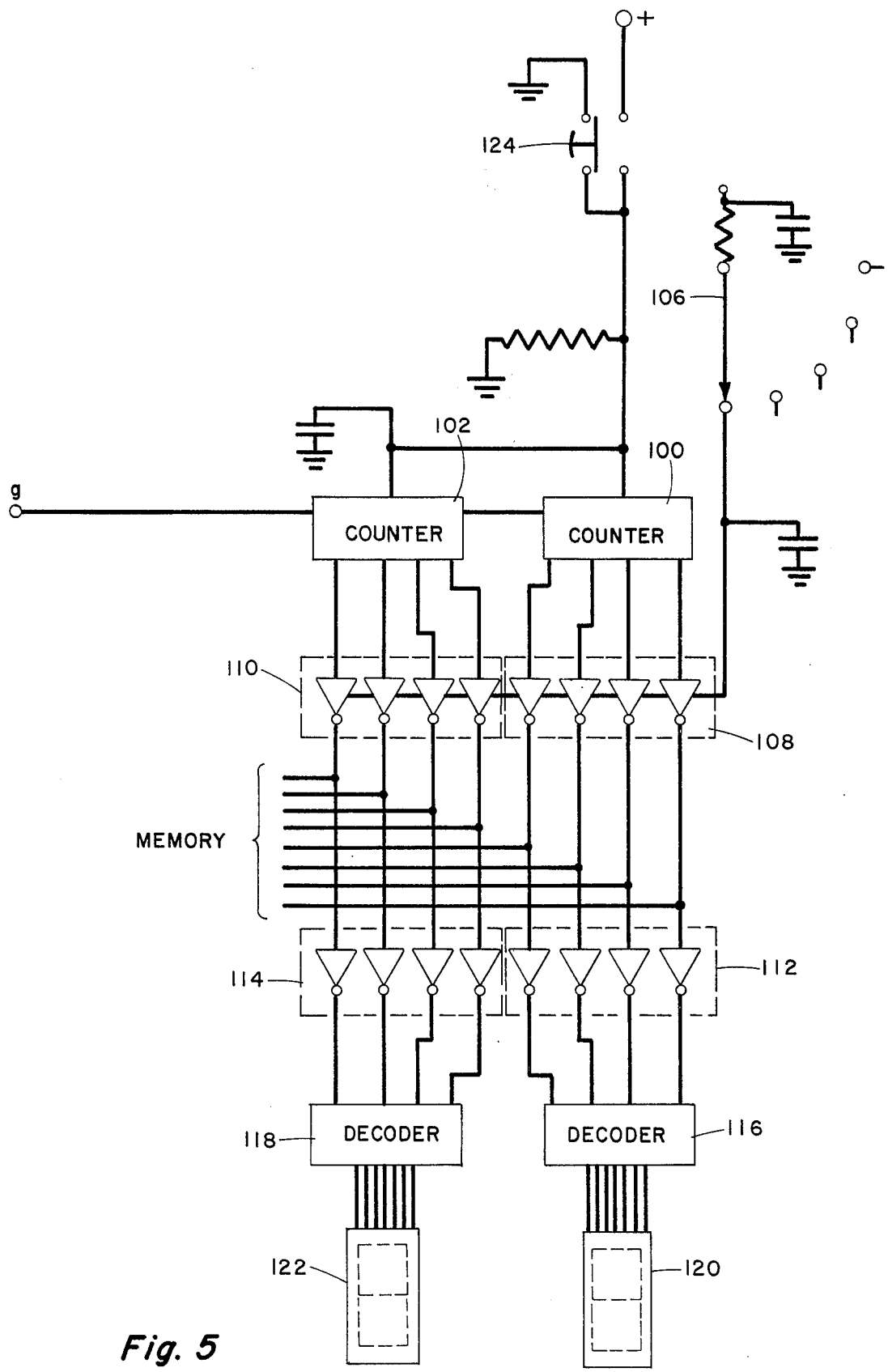

The low output pulse from NAND gate 46C is fed to inverters 54A and 54B of integrated circuit 54 (7404), as they appear in FIG. 3. The output of inverter 54B goes high and sets the address counter 56 (7493) to zero. The output of 54A also goes high and is fed to NOR gate 58A (see FIG. 4) of the integrated circuit 58 (7402). At this time, the output of gate 58A goes low to start interrogation timer 60 (NE 555). The time cycle of timer 60 is approximately ⅛ of a second. When the interrogation timer 60 is started, its output goes high and it does four things: First of all, it sends an impulse to the interrogation coil 22 as will hereinafter appear; secondly, it opens the output to the receiver 24 as will also hereinafter appear; thirdly, it starts a re-interrogation timer 62 (NE 555) which has a time cycle of approximately ½ to 1 second; fourthly, the interrogation timer 60 will "set" a setreset flip-flop 64 (7490) which allows the machine to re-interrogate until the proper tag information is received from an animal, as will hereinafter appear.

The high output from the interrogation timer 60 is fed to the interrogation coil 22 through isolating gates 58C and 58D. The interrogation coil is merely a coil which provides an electromagnetic signal which activates a magnetic reed switch inside the identification tag 20 which is on the animal, as will be hereinafter explained.

The output of the interrogation timer 60 is also fed to NOR gate 58B whose output then goes low to start a pulse detector circuit consisting of timer 66 (NE 555) and transistor Q2. At this time the output of timer 66 goes high which allows a pulse shaper 68 (NE 555) to receive pulses from the receiver 24 if pulses are present.

When the interrogation timer 60 times out, its output goes low so as to turn off the interrogation coil 22 and to start the re-interrogation timer 62. When the timer 62 times out, its output goes low and this low output is inverted by portion 70C of integrated circuit 70 (7410). At this time the signal is sent from 70C to NAND gate 70B. If no pulses were received by the receiver 24 while the interrogation coil was on, then the set-reset flip-flop 64 will still be in the "set" condition so as to allow the signal from the re-interrogation timer 62 to pass through gate 70B; the output from gate 70B goes low and is inverted by 70A and fed to NOR gate 58A which starts the timer 60 again. The re-interrogation will continue until a signal is received from a tag by the receiver 24 or until the animal leaves the machine and remakes the light beam.

If an ear tag is in the field of the interrogator coil when it is on, the ear tag will be turned on and start sending radio frequency pulses, in a manner later to be described, which are picked up by the receiver 24. The receiver 24 is a standard superheterodyne with an R.F. pulse detector. The pulses from the receiver are sent to the pulse shaper 68 whose output goes high on each pulse received. The pulses from the pulse shaper 68 are fed to four places: First of all, these pulses are fed to the pulse detector consisting of a timer 66 and transistor Q2 to hold the receiver output open until the ear tag finishes counting; secondly, these pulses are fed to an identification display 72 which displays the identification number of the animal present in the feed station; thirdly, the signals from the pulse shaper 60 are directed to the set-reset flip-flop 64 to "reset" the same to turn off the re-interrogation signal at gate 70B; fourthly, the signal from the pulse shaper 68 is sent to the address counter 56 which counts the ear tag pulses and addresses the memory to the correct memory cell corresponding to the ear tag number.

After the animal comes in and is identified, as indicated above, the machine starts counting the number of pounds of feed that are removed from the feed hopper in the following manner. The operation of the feed hopper and the signals produced by the scales will be described hereinafter in greater detail; however, for the purpose of FIG. 2, the signals produced by the scales shall be considered as consisting of two separate pulse trains (square waves) that are ninety degrees out of phase with each other and which are used to determine the direction of the count. These signals are applied at points A and B on integrated circuit 74 (7404). The circuit 74 is used as a rising and falling edge detector to determine the direction of movement of the scales, up or down. The signal at A is inverted by inverter 74A and fed to inverters 74B and 74D. The signal at B is inverted by inverter 74E and fed to NAND gates 76A and 76B of integrated circuit 76 (7400). If, when the B signal is low, a rising edge is fed to A, then inverter 74D will pass a signal to NAND gate 76B; at this point the output from the gate 76B will go high and is sent to pulse shaper and gate 78 (NE 555) as a "down" count. If, when the signal at B is low, a falling edge is fed to A then inverter 74B will invert it and inverter 74C will re-invert it and pass a signal to NAND gate 76A; at this point the output from the NAND gate 74A will go high and this output is sent to pulse shaper and gate 80 (NE 555) as an "up" count.

As feed is removed from the hopper 12, the pulse shaper and gate 80 sees the pulses corresponding to pounds as an "up" count and passes these pulses through inverter 76C to the up-down counter 50. As indicated above, counter 50 counts the units pounds and counter 52 counts tens pounds. The outputs of counters 50 and 52 are binary coded decimals corresponding to pounds. These outputs are inverted by inverters 82A, B, C, D, E and F of integrated circuit 82 (7404) and inverters 84A and 84B of integrated circuit 84 (7402); these inverted outputs are fed into NAND gate 86 (7430) which is used as a zero detector as will hereinafter appear.

After the animal has finished eating a measurable amount of feed, a positive number in pounds will be present in the up-down counters 50 and 52. At this time, the animal leaves the machine and remakes the light beam. When the light beam from the lamp 16 is re-directed to the photo transistor Q1, the output from timer 40 goes high and NAND gate 46B will pass a pulse to 46C in order to "reset" the flip-flop consisting of elements 46C and 46D. (If the animal left before the timer 48 timed out, then, when timer 48 does time out it will reset the flip-flop.) When the flip-flop 46C and 46D is reset, the output at 46C goes high; this output is passed through NAND gate 88 (7400) if a positive number of pounds is present on the up-down counters 50 and 52. As will hereinafter appear, portions 90A, B, C and D of integrated circuit 90 (7402) make up a gated flip-flop to determine if a positive number is present. If no positive number is present, this means that no feed has been eaten, and the machine does not transfer any information from the up-down counters into the memory. If, however, a positive number is present, then the output of NAND gate 88 goes low and is inverted by inverter 54C to "set" a set-reset flip-flop 92 (7490).

The up-down counters 50 and 52 which, as indicated above, are zeroed when the animal breaks the light beam, can go from 00 to 99 (assuming a two digit system) if the hopper is bumped by the animal. The reason that the counter goes backwards is that it receives a "down" pulse. Due to the mechanical hysteresis of the system, it is possible, if the animal does not eat but a small amount, for the 99 to remain in the counters. It is desired to prevent the transfer of the 99 into the memory because this would not be a valid feed weight. NAND gate 88 and gates 90A to 90D are used to prevent the invalid weight from appearing in the memory.

When the animal comes in and the up-down counters are zeroed, the output of NAND gate 86 goes low. If the "down" count line now receives a pulse going low it will appear at gate 90A. The output of 90A will go high since both inputs are low which will "set" the flip-flop consisting of gates 90C and 90D at which time the output from 90C goes low to prevent any signals from passing through NAND gate 88 to "set" the flip-flop 92. If the animal remains and eats enough to overcome the "down" pulse a low pulse appears on the "up" count line to gate 90B. This low pulse also appears at the "up" input to the counters; a short time later, the output of NAND gate 86 will go low. Since both inputs to gate 90B are now low, its output will go high which will "reset" the flip-flop 90C and 90D creating a high signal at the output of gate 90C, allowing the NAND gate 88 to "set" the flip-flop 92 in the manner described above.

When the flip-flop 92 is "set," its output goes high and triggers a clock 94 (NE555). At this time, the clock 94, referred to as the scale countdown clock, begins to generate pulses which are fed to two places: First of all the pulses from the clock 94 are fed to the "down" input of the up-down counter 50 through NOR gate 84C; secondly, the pulses from the countdown clock 94 are fed to a memory address multiplexer 96 (74154) through an inverter 54D. The address multiplexer 96 has been previously connected through a proper address cable to the memory cell of the memory corresponding to the tag number of the animal by virtue of the information supplied to element 96 from the address counter 56.

In the meantime, the clock pulses applied from the clock 94 to the up-down counter 50 causes the counters 50 and 52 to operate in reverse direction. These clock pulses are counted down until the output of the up-down counters 50 and 52 reaches zero. At this point, the output of the NAND gate 86 goes low and is inverted by inverter 84D to "reset" the flip-flop 92. Now, the output of the flip-flop 92 goes low and the clock 94 immediately ceases operation. During the period of time that the clock 94 was operating, the high output of flip-flop 92 was fed to point C on FIG. 3 which also corresponds to point C on FIG. 2; this means that the high output from the flip-flop 92 was fed through inverter 76D to gates 78 and 80 in order to close the scale input and prevent any scale movement or creep from affecting the countdown. Since the clock 94 is pulsing into the memory while it is simultaneously reducing the count on the counters 50 and 52 to zero, it should be apparent that the number of clock pulses fed into the memory is the same as that counted by the up-down counter and, therefore, corresponds to the number of pounds of feed removed from the hopper by the animal in question.

For the purposes of the present disclosure, the memory bank can be considered as consisting of sixteen memories, one for each of 15 tags plus a zero memory. Of course, if it is desired to service more or less than fifteen animals, the memory can be made larger or smaller as desired and as is well known. The zero memory stores the amount of feed eaten if no tag identification was present, thus making a complete accounting for all of the feed consumed.

Each memory consists of two counters, counter 100 (7490) for units pounds and counter 102 (7490) for 10's of pounds. Each memory is fed directly by the address multiplexer 96 which has 16 output lines represented by the address cables 104. Any positive number can be fed into a memory on top of an existing number already in that memory, and the sum of the two will be present in that memory. This means that a running total can be kept for each animal for several eating sessions. All memories are identical except for the different input lines. The memory transfer operation, triggered by the animal leaving, takes approximately 1/10 of a second. As soon as the animal has left the machine, it is ready to accept another animal.

If it is desired to recall the information in a given memory to determine the total amount consumed by a given animal, the number of the animal is dialed by a manual 16-position rotary switch 106. This applies power to two integrated circuits 108 and 110 (both 7404) which take the outputs of the memory selected and apply them to the buss lines. The information from the memory, and therefore on the buss lines, is in binary coded decimals. The information on the buss lines is inverted by integrated circuits 112 and 114 (both 7404) and fed to decoders 116 and 118, respectively, (both 7447). The decoded outputs are applied to the visual readouts 120 and 122, respectively, so that a visual reading is available for each memory. After a visual reading is taken of each memory, the memory can be zeroed by pushing the zero button 124 which can be applied to the memories individually or to all memories by a common line as desired.

Figure 6:
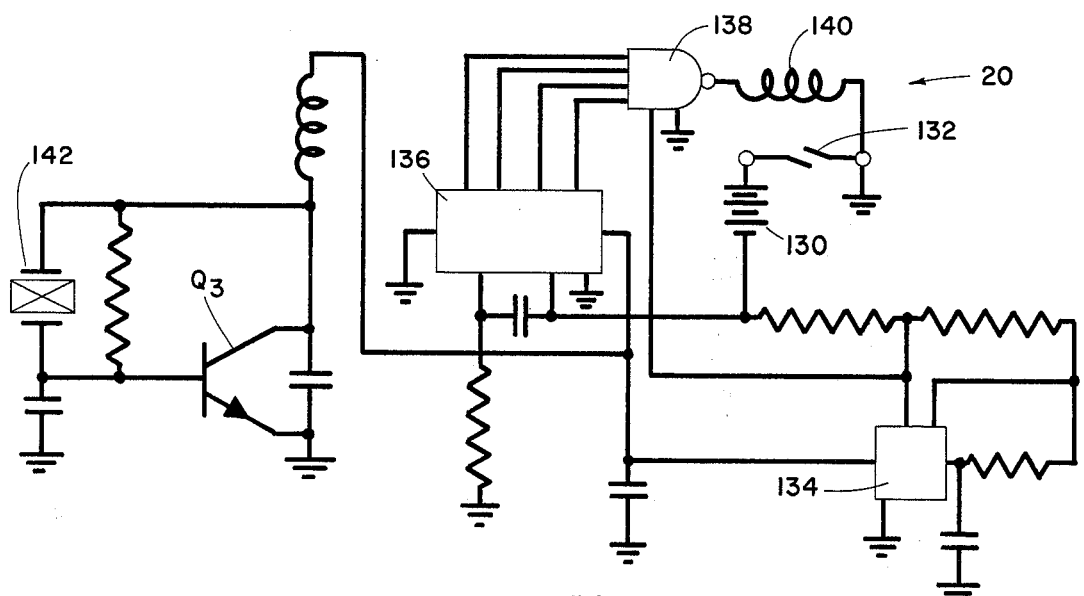
FIG. 6 is a somewhat detailed block diagram of the tag diagrammatically indicated in FIG. 1.

Referring now to FIG. 6, this represents a circuit diagram of the tag 20 which is preferably worn on the ear of the animal and which has been described previously, in broad terms, in connection with the description of FIG. 1. The ear tag 20 includes a small battery 130 (such as might be used in hearing aids or electric wrist watches), a magnetic reed switch 132, a clock 134 (NE 555), a counter 136 (7493), a NAND gate 138 (7420), a latching coil 140 for the reed switch 132, an R.F. oscillator Q3 and a crystal 142. When the animal (not shown) enters the feed station 10 and actuates the sensor 18, the interrogation coil 22 (FIG. 1) sends out an electromagnetic pulse which closes the reed switch 132 momentarily. At this time the battery 130 is connected into the circuit of the tag 20 through the reed switch 132. Closing of the reed switch 132 does three additional things: It resets the counter 136 to zero; it starts the clock 134; and, finally, it latches in the reed switch with the coil 140 through the NAND gate 138. As soon as power is applied, the clock 134 starts running with its output going alternately high and alternately low. The output from the clock 134 is directed, first of all, to the R.F. oscillator Q3 which turns on and off to provide R.F. pulses; secondly, the output from the clock 134 is directed to the counter 136 which counts the number of pulses from the clock. The output from the counter 136 is in binary code which is fed to the NAND gate 138. The output of the counter 136 can be programmed to any number (for example, 1 through 15) by connecting the appropriate output leads to the NAND gate 138. The clock 136 counts the clock pulses until its programmed output number is reached. At this time, the output of the NAND gate 138 goes low which removes power from the coil 140 around the reed switch 132. This opens the reed switch immediately to remove power from the circuit and stops the operation of the clock 134. The R.F. oscillator puts out a pulse every time the clock output goes high. Thus, the tag 20 produces R.F. pulses until the reed switch 132 is opened and the number of pulses corresponds to the number of clock pulses counted by the counter 136. Each animal's tag is programmed for a different number so that each animal can be identified by the machine as he enters.

Figure 7:
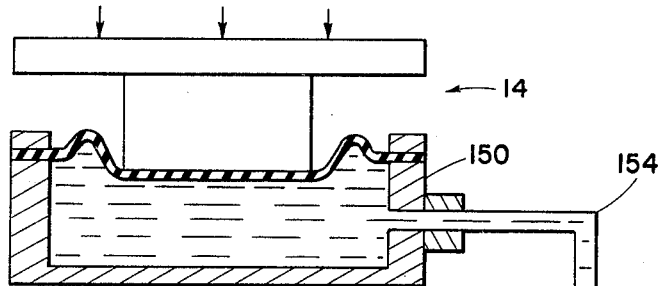
FIG. 7 is a diagrammatic representation of the scale or weightsensing mechanism employed with the present invention.

Referring now to FIG. 7, this represents a pneumatic circuit diagram of the scales 14. The feed hopper 12 is held in position by a set of four bearings (not shown) which will allow only up and down movement of the hopper. The hopper rests on a hydraulic load cell 150 which transmits changes in hydraulic pressure within the load cell 150 to a standard bourdon tube movement 152 through a hydraulic conduit 154. The bourdon tube device 152 is provided with a central shaft 156 which is operated by the bourdon tube movement in a conventional manner; at one end of the shaft 156 there is attached a pointer (not shown) which is adapted to move with respect to a stationary dial (not shown) which is calibrated in pounds to show visually the number of net pounds in the hopper at any given time. For the purposes of this application, one complete revolution of the shaft 156 represents a difference in weight of 500 pounds. Preferably an adjustable needle valve 158 is located in the conduit 154 to dampen the motions from the hydraulic load cell 150. For example, if the animal should bang against the feed hopper, an extremely hard shock might be produced; however, the needle valve 158 would allow the hydraulic fluid to pass through at a predetermined rate.

Figure 8:
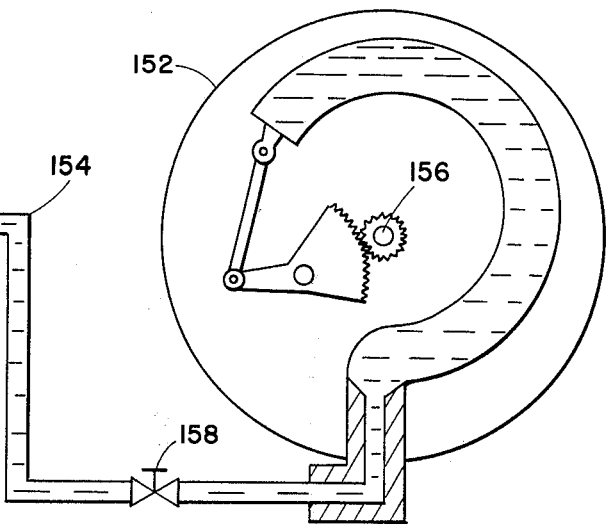
FIG. 8 is a diagrammatic representation of the mechanism employed for converting weight changes into electrical impulses.
Figure 8:
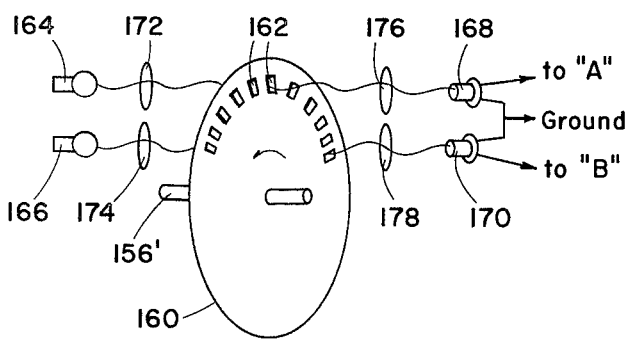

FIG. 8 shows the mechanism for converting the changes in weight sensed by the bourdon tube movement 152 into electrical impulses which are fed into the circuit of FIG. 2 through 5. This mechanism includes a rotary incoder wheel 160 which is a commercially available item. The incoder wheel 160 is mounted on a shaft 156' which can be attached to or an extension of the shaft 156 of the bourdon tube assembly 152. At any event, the shaft 156' rotates with the shaft 156. The rotary incoder wheel 160 is provided with a plurality of circumferentially arranged windows or slits 162. These windows are substantially rectangularly shaped and are 500 in number. Thus, with respect to a fixed reference position, the movement of the wheel 160 from one window to the next window represents a differential of one pound. A pair of lamps 164 and 166 are mounted on one side of the wheel 160 and a pair of photoelectric diodes 168 and 170 are mounted on the opposite side of the wheel 160. A pair of lenses 172 and 174 are arranged between the lamps 164 and 166, and the wheel 160 to direct the light beams from the lamps 164 and 166, respectively, through a pair of given windows in the wheel 160. Another pair of lenses 176 and 178 are arranged on the opposite side of the wheel 160 between the wheel and the photoelectric diodes 168 and 170 to direct the beams of light from the given windows to the diodes 168 and 170, respectively.

Figure 9:
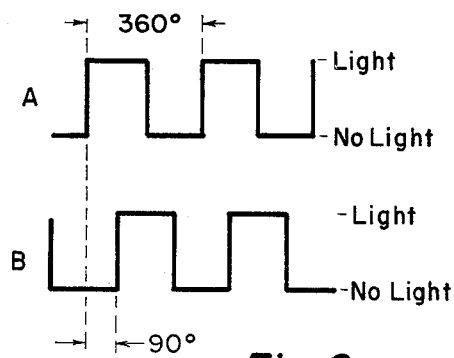
FIG. 9 is a representation of the wave forms produced by the mechanism of FIG. 8.

The movement of a window with respect to a given beam of light will produce a square wave and, since there are two beams of light, two square waves will be produced as best shown in FIG. 9. The positions of the lamps 164 and 166 and the diodes 168 and 170 are adjusted so that the leading edge of the wave form produced by the diode 168 (when a positive quantity of feed has been removed from the hopper rising will be 90° ahead of the rinsing wave form produced by the diode 170. This permits the integrated circuit 74 and associate components shown in FIG. 2 and 3 to operate in the manner previously described to sense the up and down movements of the hopper 12. Thus, the lead from the top of the diode 168 is connected to A on the integrated circuit 74 and the lead from the bottom of the diode 170 is connected to the point B on the integrated circuit 74 in FIG. 2. The wave form A of FIG. 9 represents the wave form produced by the diode 168 and the wave form B represents the wave form produced by the diode 170.

SUMMARY OF OPERATION

An animal having its own particularized identification tag 20 thereon enters the feed station 10, interrupts a beam of light from the lamp 16 and actuates a photo-sensitive device. The photo-sensitive device sends a signal to an interrogation coil which sends an electomagnetic impulse towards the tag. A reed switch within the tag 20 closes and remains closed during the period of time that a signal is transmitted from the tag, giving off impulses in binary coded form to indicate the specific identification number of the animal. The receiver 24 at the feed station receives the binary coded information from the tag and opens up a line of communication to a memory cell in a memory, the memory cell corresponding to the identification number of the animal. The photo-sensitive device also zeros a weight counter. As the animal consumes feed from a feed hopper resting on scales, the scales transmits this weight information through scales up-down logic to the scale counter, and in so doing distinguishes between up and down movements of the feed hopper. When the animal leaves the feed station, the beam of light is remade and the weight counter transmits the information therein to the cell in the memory. Thereafter the memory is zeroed. It can occur that an animal will enter the feed station, bang against the feed hopper and then leave without consuming any measurable quantity of food; because of the mechanical hysteresis it is also possible that the feed hopper might not return to the exact same position before it was banged thus giving a "negative" indication of food consumption. In this regard, the system has a built-in means to prevent the transfer of any "negative" feed consumption into the memory.

Whereas the present invention has been described in particular relation to the drawings attached hereto, it should be understood that other and further modifications, apart from those shown or suggested herein, may be made within the spirit and scope of this invention.

What is claimed is:

1. Apparatus for determining the amount of food consumed in a given time by each of a plurality of animals comprising a feed station, a scale located at the feed station, a feed hopper mounted on the scale, means for sensing the presence of an animal at the feed station, means responsive to the actuation of the presence-sensing means to determine the identity of the given animal, consumption measuring means connected to the scale for determining the amount of food consumed from the feed hopper by the given animal subsequent to the actuation of the presence-sensing means, memory means for storing the cumulative totals of food consumption of all of the animals individually, means responsive to the actuation of said identity determining means for connecting the consumption measuring means into that portion of the memory means corresponding to the given animal, and means responsive to the departure of the given animal from the feed station for returning the consumption measuring means to zero in preparation for the entry of the next animal into the feed station.

2. Apparatus as set forth in claim 1 wherein said means to determine the identity of said given animal includes an electromagnetic coil positioned at said feed station and responsive to the actuation of said presence-sensing means for providing electromagnetic pulses, identification means on each animal, each identification means including an internal source of power for the identification means, a transmitter, a magnetically responsive reed switch normally open but closable in response to the electro-magnetic pulses from said electromagnetic coil to power said transmitter in said identification means, means responsive to the closing of said reed switch for transmitting a predetermined number of pulses from said transmitter and corresponding to a predetermined number assigned to said given animal, means for holding said reed switch in closed position during the period of time that said identification means is transmitting said pulses, means responsive to the completion of the transmission of the predetermined number of pulses to open said reed switch, a receiver at said feed station for receiving said pulses from said transmitter, and an identification counter connected to the output of said receiver for counting the number of pulses received from said transmitter.

3. Apparatus as set forth in claim 2 wherein said memory means is comprised of a plurality of memory cells, one memory cell corresponding to each animal of said plurality of animals and wherein said identification counter connects said consumption measuring means to the cell of said memory means corresponding to said given animal.

4. Apparatus as set forth in claim 1 wherein said scale includes a hydraulic load cell adapted to produce a variable hydraulic pressure in accordance with the changes in weight in said feed hopper, means for converting the changes in pressure from said hydraulic load cell into a pair of square waves, one square wave representing the up movement of the hopper, and the other square wave representing the down movement of the hopper, said consumption measuring means including a weight counter receiving its input from said two square waves and counting the total net weight consumed from said feed hopper, said means responsive to the departure of the given animal transferring information concerning positive consumption only of feed from the feed hopper into said portion of said memory means corresponding to said given animal.

5. Apparatus as set forth in claim 1 including means operatively connected to said weight counter for preventing the transfer of information from said weight counter representing indicated negative consumption of feed from said feed hopper.

6. Apparatus as set forth in claim 5 including means responsive to the actuation of the presence-sensing means for zeroing said weight counter.

* * * * *